United States Patent [19]

Holmgren

[11] Patent Number: 4,464,583

[45] Date of Patent: Aug. 7, 1984

[54] APPARATUS FOR BONDING AND PROTECTING ELECTRICAL CABLE SHIELDS

[75] Inventor: Nils V. Holmgren, Greendale, Wis.

[73] Assignee: McGraw-Edison Company, Rolling Meadows, Ill.

[21] Appl. No.: 471,992

[22] Filed: Mar. 4, 1983

[51] Int. Cl.³ .............................................. H01R 7/12
[52] U.S. Cl. ................................... 307/147; 174/71 C; 174/73 R; 339/177 E
[58] Field of Search ............. 307/147, 100; 174/73 R, 174/71 C; 339/19, 177; 338/20

[56] References Cited

U.S. PATENT DOCUMENTS

| | | | |
|---|---|---|---|
| 3,509,518 | 4/1970 | Phillips | 174/73 R |
| 3,857,071 | 12/1974 | Nikaido et al. | 307/147 X |
| 4,025,150 | 5/1977 | Nordberg et al. | 339/177 R |
| 4,296,002 | 10/1981 | Sokoly et al. | 338/20 X |

*Primary Examiner*—Thomas H. Tarcza
*Assistant Examiner*—Derek Jennings
*Attorney, Agent, or Firm*—Jon C. Gealow; James A. Gabala; Hugh Gilroy

[57] ABSTRACT

An apparatus is provided for single-point, multi-point or cross-bonding electrical power cables. The apparatus includes an electrically insulated housing which defines an access well, two electrical conductors each having one end disposed within the well, a cover for closing-off the well, a linking device carried by the cover for removably and electrically connecting together those ends of the two electrical conductors which are disposed within the well, and a connecting device for electrically connecting the linking device to a terminal on the exterior of the housing. In the preferred embodiment a movable over-voltage protective device or surge arrester is electrically interposed between the linking device and the connecting device. When the cover is installed two electrical conductors are electrically connected together and to the surge arrester. Other embodiments are described and illustrated.

16 Claims, 15 Drawing Figures

APPARATUS FOR BONDING AND PROTECTING ELECTRICAL CABLE SHIELDS

TECHNICAL FIELD

The present invention relates to electrical power cables which are cross-bonded, single-point bonded, or multi-point bonded together. In particular, the invention relates to a unique apparatus to facilitate connecting the shielded sections of adjacent power cables in such a matter that the shielded bonds may be interrupted for test purposes and protected against overvoltage conditions.

BACKGROUND OF THE INVENTION

Those skilled in the art know that the efficiency of cables used to carry power frequency current can be increased by minimizing the circulating currents that are induced in the shielded sections of those cables. Depending upon the distance over which the cables are strung, the cable shield may be bonded together at one or more points. Typically, short lengths of cable have one bond point (single-point bonding) while longer lengths of cable have their shields separated into several segments which are subsequently cross-bonded together. These and/or other bonding methods may be repeated (multi-point bonding) any number of times along the cable route.

It is common for utilities to provide bonding only to the degree required; however, there is no well established criteria when special bonding should be introduced. For single conductor cable circuits, where load currents are above about 500 amps., it is usually more economical to apply some type of bonding since the reduction of losses will permit the use of a lower ampacity cable. In general, cross-bonding is the most effective technique (relative to other bonding techniques) to use for reducing circulating currents and over voltages on the shields. It is also the most expensive to implement. Single point bonding in its many forms is less effective (relative to cross-bonding) at reducing losses due to circulating currents. It also contributes to higher over voltages and is less costly to implement and maintain. Utilities will often employ the less effective, although adequate, single-point bonding when the cable systems are lightly loaded; more effective and complicated cross-bonding method will be employed when loading of the cable is increased (so as to essentially up-grade the system). However, to accomplish this, the interconnections between shields and grounds must be reconfigured.

Although circulating currents can be reduced by single-point bonding, multi-point bonding or cross-bonding, the induced potentials between the shield and the ground are increased. Even though there are no established standards which stipulate how high these shield-to-ground potentials can be raised, safety dictates that the shield-to-ground potential should be kept low. Generally speaking, induced circulating currents and voltages between the shield and the ground are proportional to the magnitude of the current. Voltage surges on the shields comes from lightning, switching, or at the instant of cable failure during service or DC proof-testing. In particular, when a fault current flows, the potential between the shield and the ground can rise to a value which is capable of damaging the power cable and the associated distribution system. The following components may be exposed to these potentially damaging surges: the dielectric at the shield interruption; cable jackets; insulation applied over the metallic shields at the joints; any component connected to the shields or their interconnecting leads; the insulation on the leads connected to those components; and the associated stand-off insulators.

One way of preventing an uncontrolled build-up of voltage is to use surge arresters or over-voltage limiters at suitable locations throughout the cable distribution system. A logical place to provide these voltage limiting devices is at those locations where the cable shield was broken to single-point, multi-point or cross-bond the cables together. Unfortunately, the process of constructing the required electrical connections to the cable shield is a difficult, labor intensive, expensive operation requiring a relatively high degree of skill. Current practice has been to construct the bonding joints and hand-lay a tape covering to restore the insulation system and to re-establish mechanical integrity. Some manufacturers have made available cast iron boxes into which the shield extensions may be introduced and the single point bonding or cross-bonding completed. High voltage cable connectors exist (e.g., U.S. Pat. No. 3,509,518) but not for single-point bonding, or cross-bonding. Those devices are, for the most part, quite large and function simply as ordinary junction boxes. Those skilled in the art know that once the electrical connections are constructed, the finished work must be verified or tested. Ideally, this verification should be accomplished by disturbing the recently completed electrical connections as little as possible or else the test may be meaningless. Imperfect reconstruction of the insulation only reduces the electric reliability of the joint and increases the likelihood of subsequent failure.

It is clearly desirable that a method and apparatus should be provided for simply and rapidly single-point bonding or cross-bonding together the shielded sections of power cables. Moreover, if the apparatus and method incorporates features which allow testing without breaking integrety of the shielded connections, which provide for over-voltage protection, which allow for up-grading of the cable system while reusing existing components, and which allow use in a plurality of single-point bonding or cross-bonding cable protection schemes, then a significant improvement would be contributed to the electrical utility industry.

SUMMARY OF THE INVENTION

In accordance with the present invention an apparatus is provided for protecting from over-voltage and for bonding the shields of single-point, multi-point or cross-bonded electrical power cables. The principal or main body of the apparatus is formed from an insulated electrical housing, having an interior connecting cavity which has an opening disposed towards the exterior of the housing. The housing carries two electrical conductors, each having one end disposed to the interior of the connecting cavity and one end disposed on the exterior of the housing. It is to these latter ends that the shielded sections of two power cables are connected when the apparatus is applied in cross bonded scheme. It is to these latter ends that the shield and the ground are connected (e.g., a single-point bonded system). The housing connecting cavity is closed off by a cover, preferably made of insulating material, which carries a linking device for removably and electrically connecting together those ends of the two electrical conductors which are disposed within the connecting cavity. Finally, the housing carries a connecting device for electrically connecting the linking device to the exterior of the housing. In one embodiment this exterior connection would be electrically joined to the ground; thus, the two electrical conductors are electrically connected together and to the connecting device when the cover is put in place, and the two power cables are cross-bonded to each other.

In another embodiment of the invention, the connecting device is in the form of a plug which is removably and sealingly connected to a complimentary cavity defined within the housing. In that embodiment the housing plug includes a terminal-like connecting device which has one end disposed on the exterior of the housing when the plug is inserted into the housing. The housing plug also includes a varistor which is electrically connected in series with the linking device and the exterior terminal when the plug is inserted within the housing. The varistor provides over-voltage protection to the cross-bonded shielded sections of the two cables.

In still another embodiment of the invention, an intermediate plugging means is provided for electrically connecting the linking device to the exterior of the housing and for carrying the housing plug previously described. The intermediate plugging means is preferably formed in such a matter that it is adapted to fit within the same cavity to which the housing plug is inserted and defines an internal cavity similar to that for seating the housing plug. Thus, the housing plug is carried in a "piggy-back" fashion atop the intermediate plugging means. This allows other cables or leads to be electrically connected across the varistor.

In yet another embodiment of the invention, a test cover is provided which carries an electrical terminal adapted to be connected to at least one of the two electrical connectors disposed within the housing. This is useful during testing of the various connections between the cables and the housing.

Numerous other advantages and features of the present invention will be come readily apparent from the following detail description of the invention and its various embodiments, from the claims, and from the accompanying drawings.

BRIEF DESCRIPTION OF THE DRAWINGS

FIG'S. 6A and 6B illustrate two methods for connecting together the shielded extensions illustrated in FIG. 2 with the electrical connectors carried by the apparatus shown in FIG. 5.

DETAIL DESCRIPTION OF THE PREFERRED EMBODIMENT

While this invention is susceptible of embodiment in many different forms, there are shown in the drawings and will herein be described in detail preferred embodiments of the invention. It will be understood, however, that the present disclosure is to be considered as an exemplification of the principles of the invention and is not intended to limit the invention to the embodiments specifically illustrated.

The description, of the apparatus of this invention will be described with reference to the positions shown in the drawings. It will be understood, however, that the apparatus of this invention may be manufactured, stored, transported and used in orientations other than that position specifically illustrated. Thus, the terms herein are used in a relative sense. Similarly, although the invention is discribed in detail as applied to cross-bonded cable systems, those skilled in the art will appreciate the manner in which the discribed apparatus can be applied to provide over-voltage protection and bonding of shields in a single-point or a multi-point bonded cable system.

In order that the invention may be understood and, in particular, the manner in which it is used will be appreciated, the general concepts involved in the cross-bonding of electrical power cables will be described first.

Figures 1, 2:
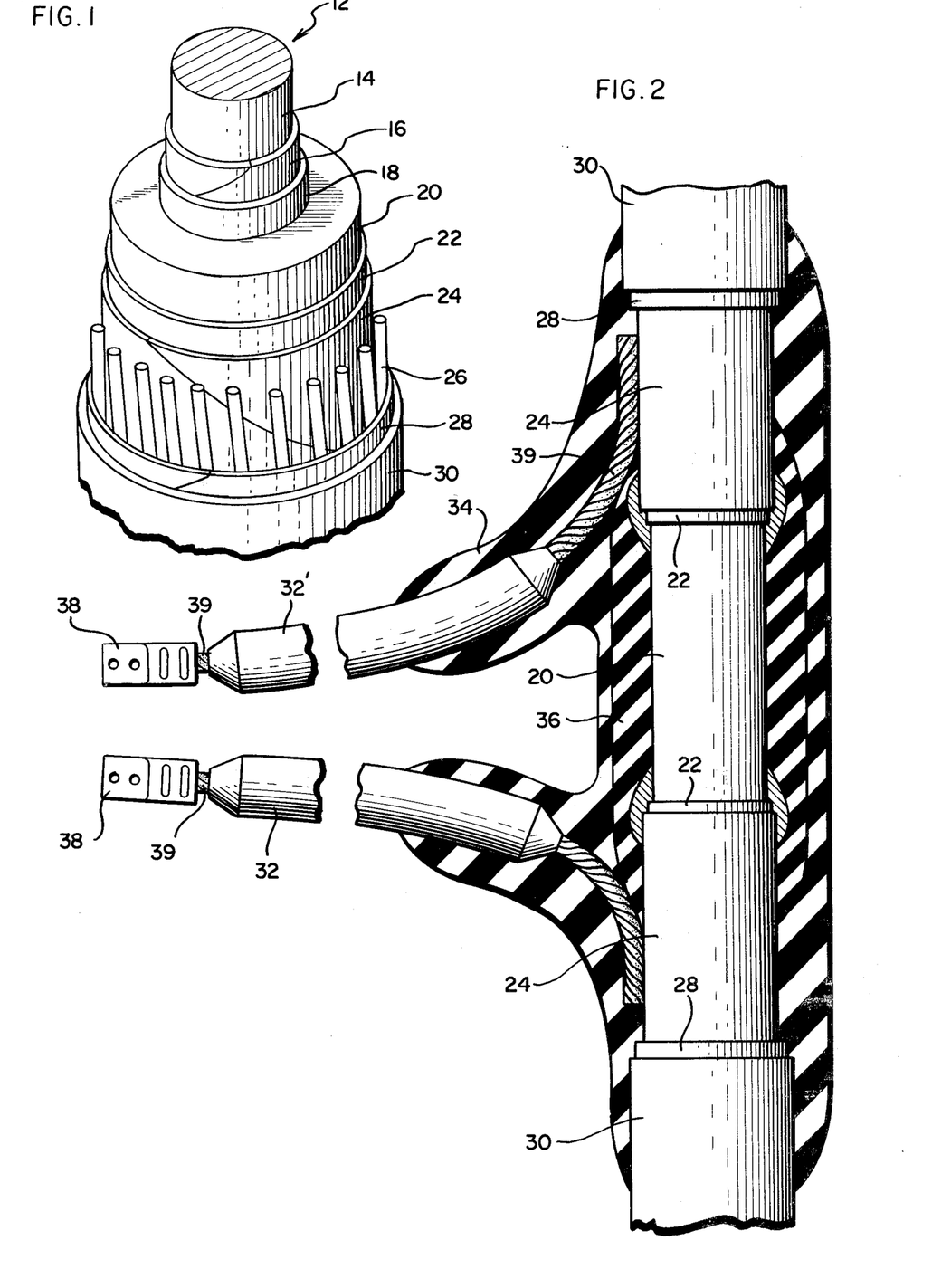
FIG. 1 is a representative, cross-sectional perspective view of an electrical power cable of the type to which the present invention is adapted to be used.
FIG. 2 is a cross-sectional, side view of a cable of the type shown in FIG. 1 to which electrically conductive shield extensions have been joined.

FIG. 1 is representative of a power cable 12 which is commonly used to carry power frequency current, particularly in underground installations. Specifically, a central conductor 14, generally stranded, is showned wrapped with: a semi-conducting tape 16; a conductor shield 18 (e.g., semi-conducting polyethylene); primary insulation 20 (e.g., cross-linked polyethylene-XLP); an insulation shield 22 (e.g., semi-conducting polyethylene); a continuous metallic shield 24 (e.g., copper tape); a stranded metallic shield 26 (e.g., copper wire); a semi-conducting separator tape 28; and an outer jacket 30 (e.g., polyethylene). Typically, the power cable 12 has an outer diameter of approximately 3½ inches.

Referring to FIG. 2, the cable 12 is prepared for cross-bonding or single-point bonding by removing a section of the outer jacket 30 and then separating-/removing a section of the outer metallic shield 24 and 26 to create an open circuit in the outer shielded section of the cable. Connections to the cable shield are obtained by joining (electrically and mechanically), in most cases, insulated electrical connectors 32 to the cable shield on each side of the break. Subsequently, the electrical insulation is re-established and the mechanical strength of the cable system is restored. Those skilled in the art know that, in cross connecting the shields of adjacent cables (or connecting the shields to ground), the most pains-taking and laborious operation is the reconstruction of the insulating system after the shielded sections have been electrically and mechanically mated to the electrical connectors 32. The simplest reconstruction involves the use of electrical tapes 34 and the addition of dielectric material 36. *Standard Handbook For Electrical Engineers*, 11th edition, page 18–90ff. More elaborate systems employ the pouring of resinous material (in a liquid or semisolid state) into a special container disposed around the conductors (i.e., often called the process of "potting"). More recent methods employ elastic sleeves and especially formed connectors (i.e., sometimes called "hot dogs" because of their appearance). Still more elaborate systems employ techniques in which the insulation is reconstructed with special tapes (i.e., EPR or polyethylene) that are subsequently cured (i.e., vulcanized) at an elevated temperature.

Figure 4A:
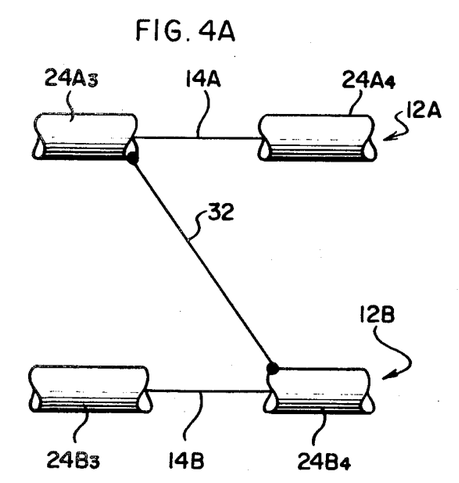
FIG. 4A is a simplified schematic illustration of the manner in which two adjacent shielded sections of two power cables may be cross-bonded together.
Figure 4B:
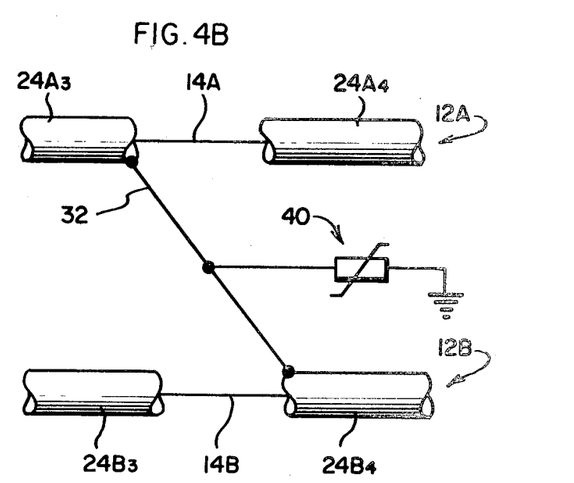
FIG. 4B is a schematic illustration of the manner in which the shielded sections of two adjacent power cables may be cross-bonded together with an over-voltage protection device joining the cross connection to ground.
Figure 4C:
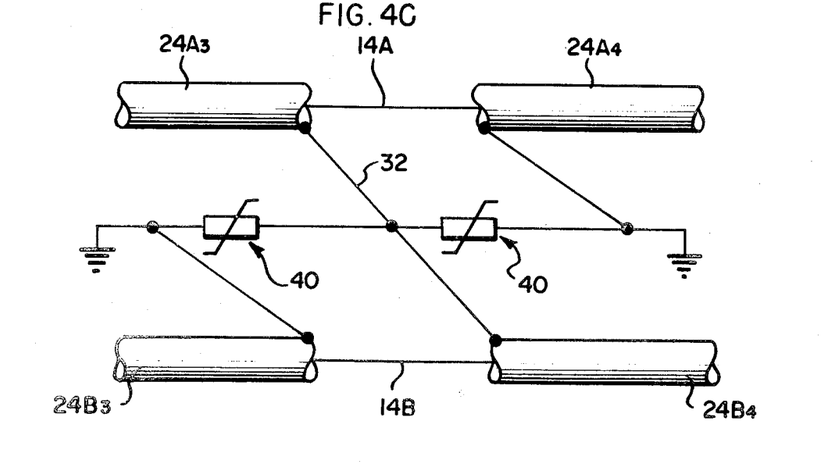
FIG. 4C illustrates still another scheme for joining together the shielded sections of two adjacent power cables wherein two over-voltage protection devices have been inserted.
Figure 4D:
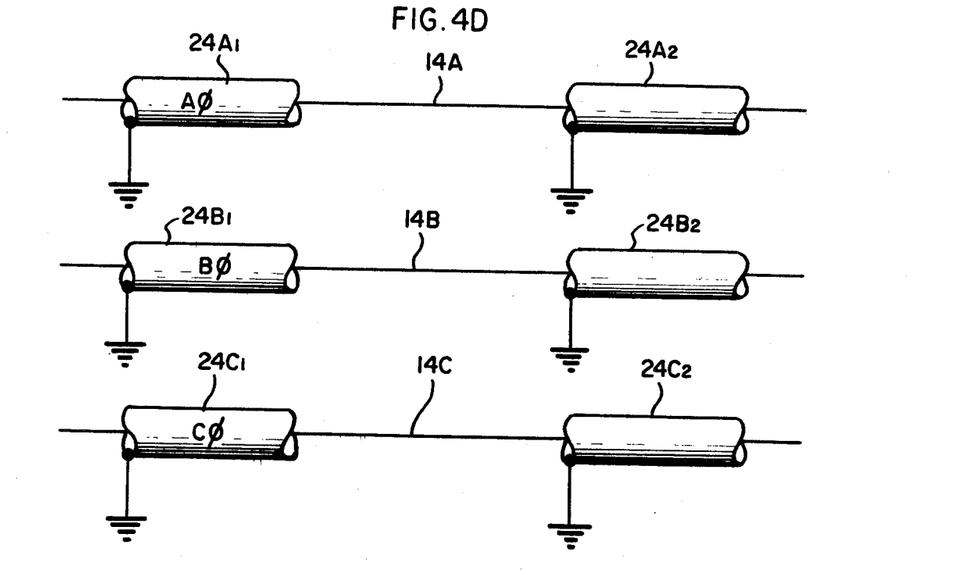
FIG. 4D is a simplified schematic illustration of one manner in which shielded sections of power cables may be single-point bonded.

Once the electrical connections 32 shown in FIG. 2 have been made, the free ends of those connections are joined to similar connections from the adjacent power cables or directly to ground (See FIG. 4D). To facilitate joining the electrical connections 32, the free ends may be provided with crimped-on terminals 38. These terminals are particularly useful for conducting pre-operational tests of the electrical cable system wherein electrical data pertinent to the cable system must be obtained. This is because, in order to obtain this electrical data, the shields 24 or their extensions 32 must be accessible and isolatable from the adjacent cables or ground.

Figure 3:
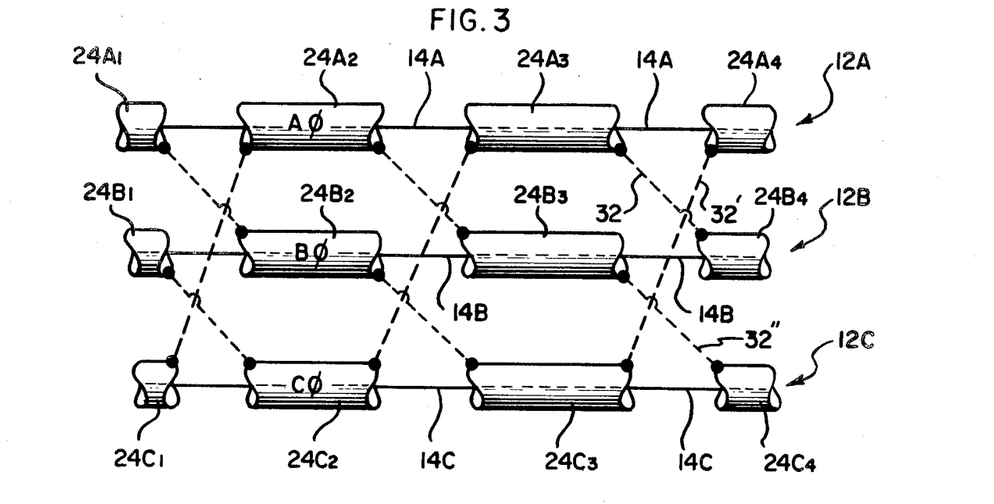
FIG. 3 schematically illustrates the manner in which the shielded portions of the three phases of an electrical power distribution network may be joined together or cross-bonded.

The cable shields may be bonded together at one or more points. In FIG. 3, three electrical power cables 12A, 12B and 12C are used to transmit three-phase electrical power. Each power cable 12A, 12B and 12C has a continuous unbroken central conductor 14A, 14B and 14C and a series of broken shielded sections (i.e., $24A_1$, $24A_2$, $24A_3$, and $24A_4$ for cable 12A). In this particular cross-bonding scheme, the shielded section on one side of each break is electrically connected to a corresponding but opposite shielded section of an adjacent power cable (i.e., shielded section $24A_3$ of cable 12A is joined to shielded section $24B_4$ of cable 12B by electrical connection 32). In this way the circulating currents induced and the cable shields are minimized. FIG. 4A shows in more detail other cross-bonding schemes are of coarse possible and could, for example, consist of transposing the main power conductors 14A, 14B, and 14C two adjacent power cables 12A and 12B.

Figure 4E:
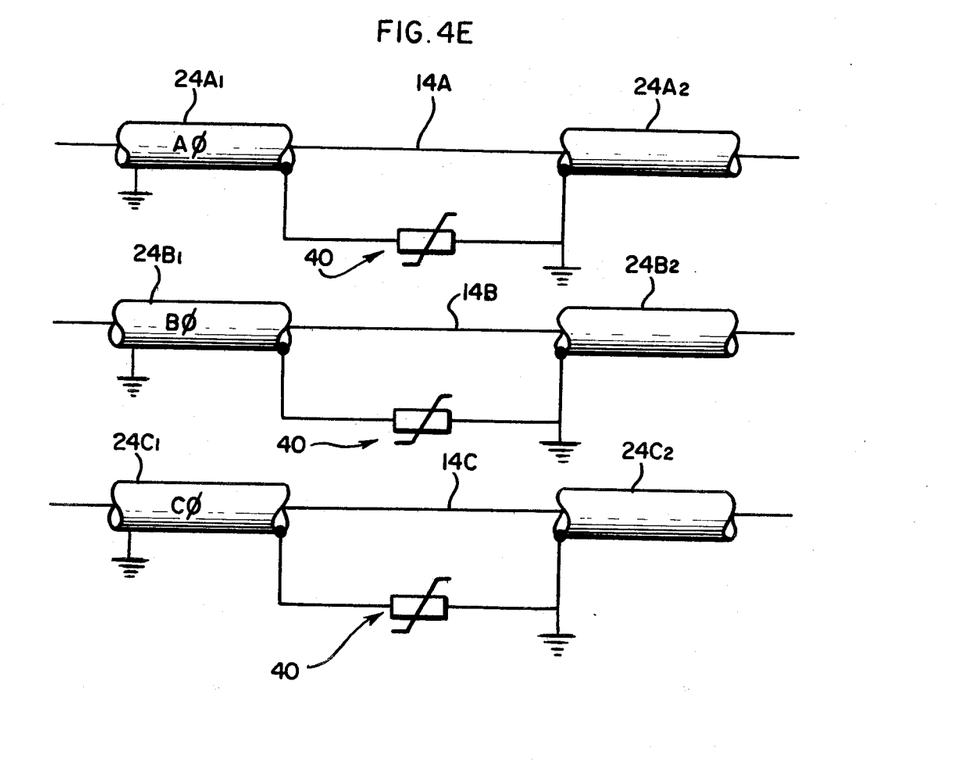
FIG. 4E is a schematic illustration of one manner in which the shielded sections of power cables may be single-point bonded together with an over-voltage protection device protecting the shield gap.

As a result of cross-bonding the induced circulating currents are reduced; however, induced potentials between the shields and the ground are increased. Uncontrolled voltage build-up can be limited by the addition of surge arresters 40 placed between the shield connectors 32 and the ground (see FIGS. 4B and 4C). Other schemes are, of course, possible (i.e., connecting a surge arrester between adjacent corresponding shield connections of the same cable, between 32 and 32' of FIG. 2, etc., to form a shield-to-shield vice shield-to-ground connection, such as required for single-point bonding in FIG. 4E).

Figure 5:
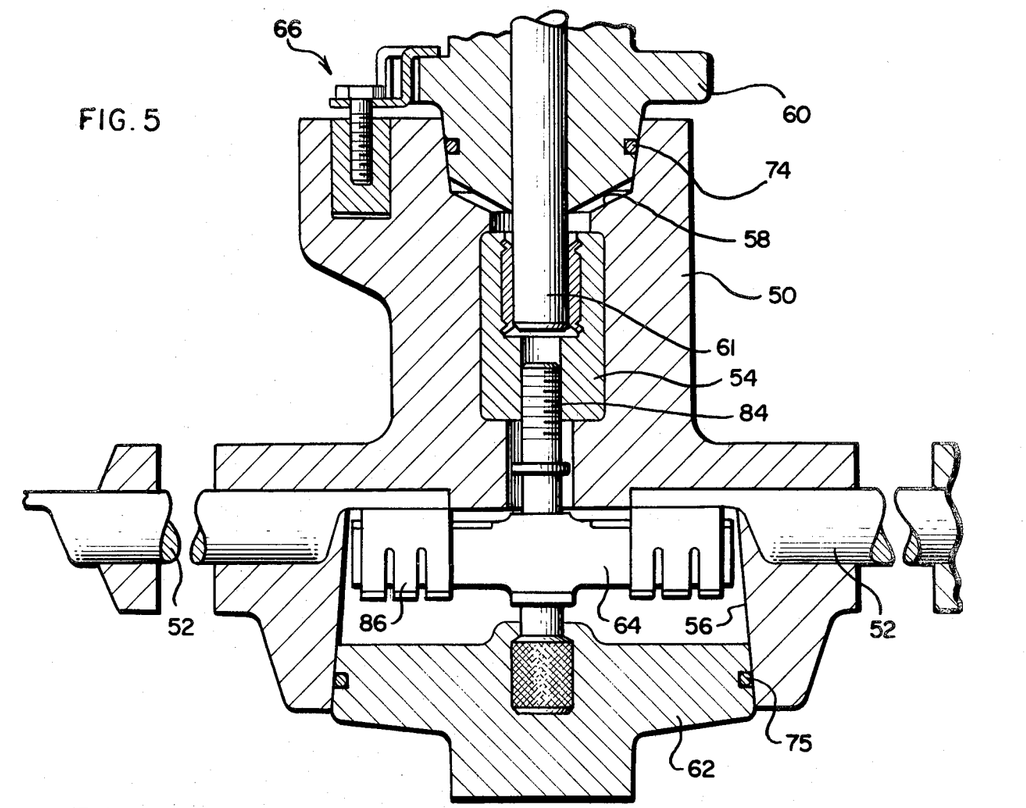
FIG. 5 is a cross-sectional elevational view of the apparatus that forms one embodiment of the present invention.

Now that the principles of cross-bonding electrical cables have been reviewed, the major components of the invention will be identified in general and then the various components will be described in greater detail. Referring to FIG. 5, a molded or "cast" resin/epoxy housing is illustrated having two molded-in electrical conductors 52 and an internal molded-in contact or terminal 54. The housing 50 is generally barrel shaped and defines two wells or cavities 56 and 58. One well 56, the lower well, provides access to the inwardly disposed end of each electrical conductor 52. The other well 58, the upper well, provides access to the internally disposed, molded-in terminal 54. The lower well 56 is adapted to receive a removable cover 62 which carries a link 64 which joins together the two inwardly disposed ends of the two electrical conductors 52. The link 64 is adapted to be received by the internal terminal 54 when the cover 62 is installed. The upper well 58 is preferrably adapted to carry an over-voltage protection device or surge arrester 60 (See FIG. 7). The surge arrester 60 mates and couples to the upper end of the internal terminal 54. A clamping means 66 holds the surge arrester 60 against the housing 50. Now that the major components of the invention have been identified, additional features of the invention will be described.

Figure 6A:
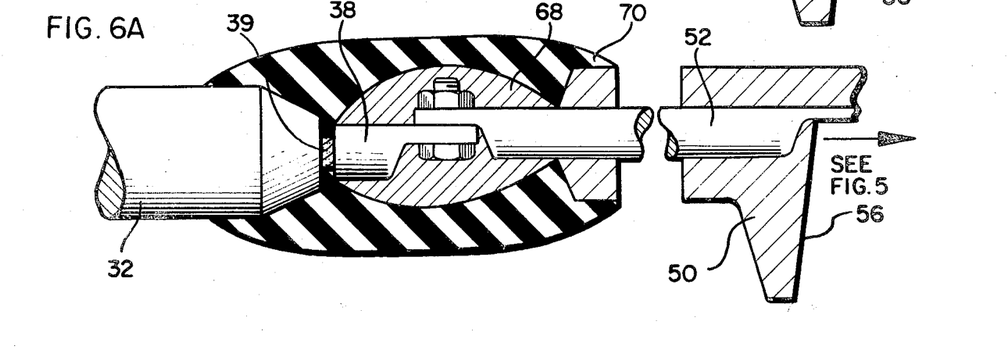
Figure 6B:
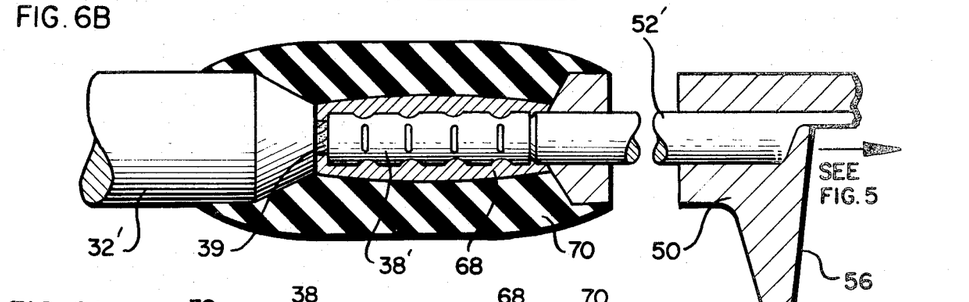

Turning to FIG. 6, two schemes are illustrated for joining the free ends of the electrical conductor 52 carried by the housing 50 with the free end of the shield extensions or the electrical connectors 32 which are joined to the cable shields. In FIG. 6A a bolted connection is used while in FIG. 6B a crimped connection is used. In both cases, after the housing electrical conductor 52 or 52' is joined to a shield extension 32 or 32', the joint is wrapped with conducting tape 68 and an outer layer of insulating tape 70. It should be clear that many other types of connections will accomplish the same function. For example, plug-in connectors and protective boots may be employed or the free ends may be joined directly to the cable shields.

Figure 7:
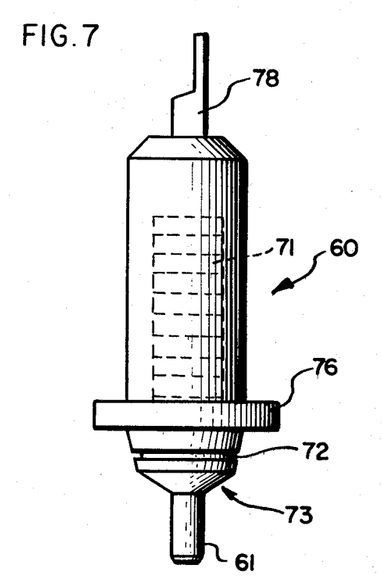
FIG. 7 illustrates an over-voltage protection device (reduced in size for purposes of illustration) that fits within the upper portion of the apparatus shown in FIG. 5.

Referring to FIG. 7, one embodiment of the over-voltage protection device 60 is illustrated. The operation of over-voltage protective devices such as surge arresters should be well known to those skilled in the art. Typically, varistor (voltage variable resistor) or metal oxide non-linear resistor disks or blocks (e.g., U.S. Pat. No. 4,272,411) are stacked 71 together in an insulated plug-like housing with or without a spark gap. See pages 76–82 of *Electrical World* (Apr. 1, 1979) for a concise summary of the art. One end 73 (the lower end) is generally complimentary to the upper well 58. In this embodiment, the lower end 73 is provided: with a grove 72 which adapted to receive an O-ring 74 (see FIG. 5); a flange 76 which seats atop the housing 50 and mates with the clamping means 66; and a plug-in (male) connector 61 which mates with housing internal terminal 54 (female). Thus, when the clamping means 66 is applied, the O-ring 74 seals the interior of the housing 50 and the varistor terminal 61 from the surrounding environment. The upper end of the over-voltage protective device 60 provided with a terminal 78 which typically joined to the ground. In the embodiment illustrated in FIG. 7, a spade terminal or lug 78 is provided to be used with a bolted connection much as that illustrated in FIG. 6A.

Figures 9, 10:
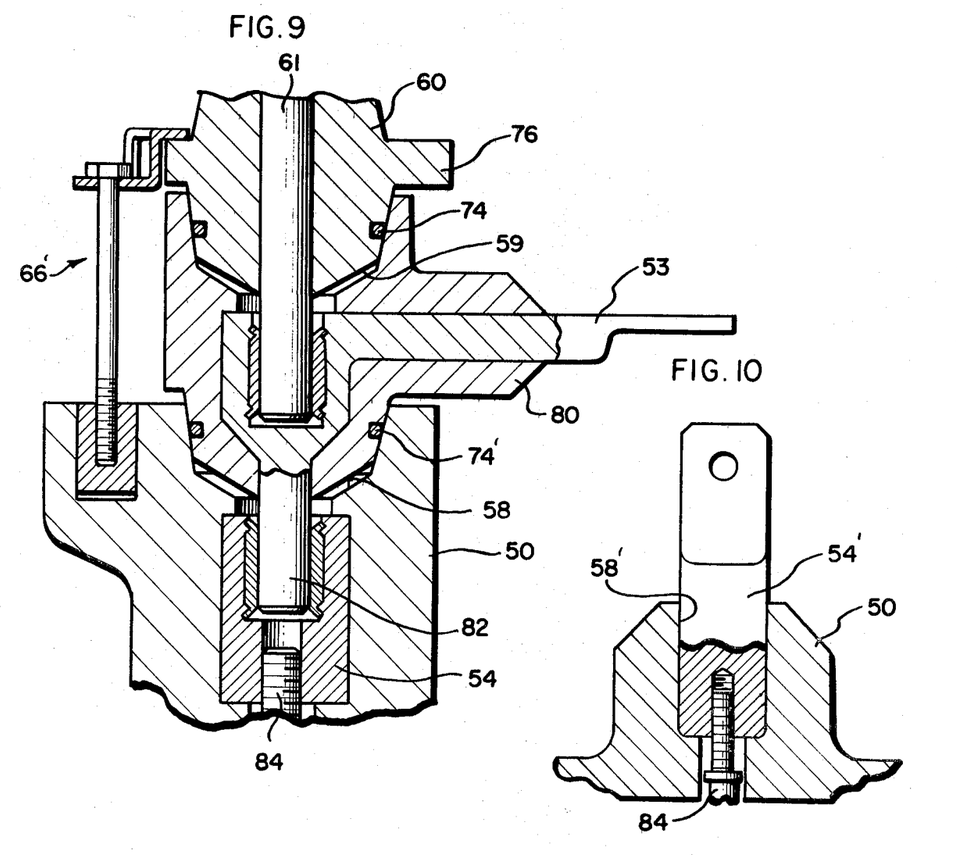
FIG. 9 is a cross-sectional, elevational view of an intermediate plug assembly adapted to fit within the cavity at the upper end of the apparatus shown in FIG. 5.
FIG. 10 illustrated another embodiment of the invention wherein the upper portion of the housing shown in FIG. 5 carries an integral electrical terminal or link.

For those instances where in a cross-bonded scheme it is desirable to apply the over-voltage protective device 60 across two phases, two connections must be made to the cross-bonded shielded extensions 32. FIG. 9 illustrates an adaptor 80 that, when interposed between the over-voltage protective device 60 and the upper well 58, provides an additional electrical conductor 53 for the cross-bonding scheme illustrated in FIG. 4C. Specifically, this piggy-back adaptor 80 has one end (the lower end in FIG. 9) which is generally complimentary to the upper well 58 and, for the most part, similar to the lower end 73 of the over-voltage protective device or surge arrester 60 shown in FIG. 7. The upper end of the adaptor 80 is similar to the upper well 58 in that it also defines a well 59 which is adapted to receive the lower end 73 of the surge arrester 60. The lower end of the adaptor 80 carries a molded-in electrical conductor 82 (here integral with conductor 53) which mates with the upper end of the internal terminal 54 and the lower end of the surge arrester 60.

It may be desirable in some instances to provide a spade-like terminal at both ends of the surge arrester or over-voltage protective device 60. For example, this will allow the surge arrester 60 to be located in a relatively remote location from the electrical cable system. To accommodate this arrangement, the upper well 58 is effectively eliminated and the internal terminal 54 is extended beyond the upper end of the housing 50. This situation is illustrated in FIG. 10. Effectively, the internal terminal 54' functions much as one of the molded-in electrical conductors 52. Under this arrangement the over-voltage protective device or surge arrester 60 is mounted separately from the housing 50 and connections (much as those illustrated in FIG. 6) are made up between the internal terminal 54' and the separately mounted surge arrester 60'.

Turning our attention now to the lower end of the housing 50 (see FIG. 5), the link 64 and cover 62 will now be discussed in greater detail. The cover 62 is preferably made from the same material as the housing 50. The cover 62 is provided with a peripheral groove carrying an O-ring 75 and a central threaded connector or mating shaft 84. The lower end of the mating shaft 84 is molded into the cover 62. The upper end of the mating shaft 84 is provided with threads to engage the lower end of the internal terminal 54. The link 64 is mounted intermediate the ends of the mating shaft 64. When the mating shaft and cover 62 are advanced into the housing, a pressure force is applied to the O-ring 75 and the interior of the housing 50 is sealed from the ambient. In the embodiment illustrated, the internally disposed ends of the two electrical conductors 52 are provided with generally U-shaped spring clips 86 which mate with the two ends of the link 64 when the cover 62 is joined to the housing 50. Thus, when the cover is inserted, the link joins two electrical conductors 52 with the internal terminal 54. If it becomes necessary to electrically open the cross-bonding connections between two electrical power cables (or the single-point bond between a shield and the ground) and to provide access to the shield extensions and surge arrester, all that one needs to do is remove the cover 62 from the housing 50.

Figure 8:
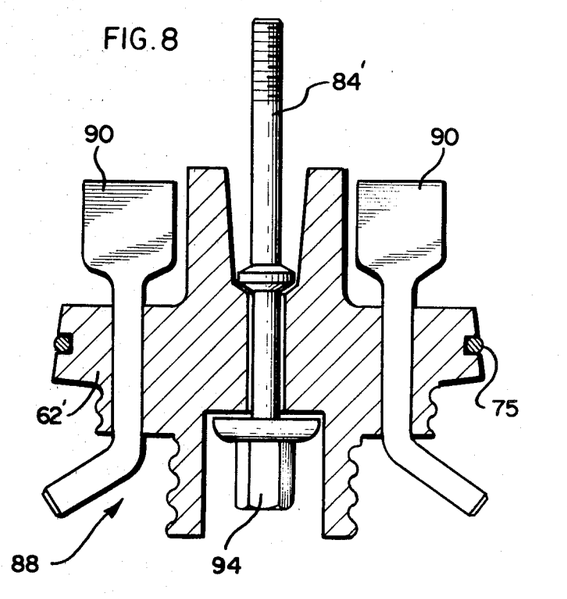
FIG. 8 is a cross-sectional, elevational view of a test cover adapted to fit within the lower end of the apparatus shown in FIG. 5.

To provide ready access to the surge arrester and the two shields which are cross-bonded together (or to a shield which connected to the ground), a test adapter or test cover assembly 88 is preferably provided. This is illustrated in FIG. 8. In that embodiment, the test cover 62' carries a free-wheeling, electrical conducting mating shaft 84' and two electrical test terminals 90. Unlike the cover 62 shown in FIG. 5, the mating shaft 84' is not molded into the cover 62'. To install the test cover assembly 88, all that one needs to do is to align the interior ends 92 of the test terminals 90 with the spring clips 86, and then drive the mating shaft 84' into the internal terminal 54. Once the test cover assembly 88 is in place, technicians need only connect the free ends of the test terminals to their test equipment to have access to the shielded sections of the single-point bonded or cross-bonded power cables. The exposed end 94 of the mating shaft 84' provides access to the over-voltage protective device 60 and permits testing without disturbing any of the other electrical connections.

From the foregoing description, it should be clear that a unique electrical apparatus is provided which facilitates single-point, multi-point or cross-bonding electrical power cables, provides a means for conveniently connecting over-voltage protective devices such as surge arresters to the shielded sections of those cables, provides a quick and easy means for electrically isolating the single-point, multi-point or cross-bonded connections without disturbing cable splices, and provides easy access to the over-voltage protective device and the cable shields for testing. Moreover, it should be clear that the apparatus just described is adapted to be used with a variety of single-point bonded, multi-point bonded or cross-bonding electrical connection schemes (i.e., surge arrester connected between the shields and ground or connected between adjacent shields, etc.) and with a variety of over-voltage protective devices (i.e., ones with plug-in terminals, ones with spade connections, etc.). Those skilled in the art will appreciate that the apparatus, once installed, occupies very little space and requires relatively short electrical leads or connections. The use of shorter leads is an advantage in that improved protection characteristics can be developed by the over-voltage protective device that is connected to the shield bonding points. In general, this improved protection results from the decreased time required for a voltage surge to travel over a shorter lead as compared to a longer lead. The shorter leads permit the rising voltage surges to reach the protective device in a shorter period of time at which point it is limited in magnitude.

Clearly, there are numerous variations and modifications that may be effected without departing from the spirit and scope of the novel concept of the invention. For example, the over-voltage protective device or surge arrester may be integrally mounted within the housing. Thus, it should be understood that no limitation with respect to the specific apparatus illustrated herein is intended or should be inferred. It is, of course, intended to cover by the depended claims, all modifications which fall within the scope of the claims that follow.

What is claimed is as follows:

1. Apparatus for single-point bonding, multi-point or cross-bonding electrical power cables, comprising:
   a. an insulated electrical housing having an interior connecting cavity open to the exterior of said housing;

b. insulated cover means, removably carried by said housing, for covering the opening to said connecting cavity;
c. a first electrical conductor, carried by said housing, having one end disposed to the exterior of said housing and an opposite end disposed within said connecting cavity;
d. a second electrical conductor, carried by said housing, having one end disposed to the exterior of said housing and an opposite end disposed within said connecting cavity;
e. linking means, carried by said cover means, for removably and electrically connecting together those ends of said first and second electrical conductors which are disposed within said connecting cavity; and
f. connecting means, carried by said housing, for electrically connecting said linking means to the exterior of said housing, whereby said first and second electrical conductors are electrically connected together and to the exterior of said housing when said cover means is in place.

2. The apparatus set forth in claim 1, wherein said connecting means includes a plug portion which is removably and sealingly connected to said housing, and wherein said plug portion includes a first terminal having one end disposed to the exterior of said housing.

3. The apparatus set forth in claim 2, wherein said plug portion includes a varistor which is electrically in series with said linking means and said first terminal when said plug portion is carried by said housing.

4. The apparatus set forth in claim 1, wherein said one end of said first and second electrical conductors are adapted to be removably connected to the sheath of a shielded electrical cable.

5. In an electrical power distribution system including:
a first cable having a first electrical conductor defining two ends, two spaced apart shielded sections, each of which is electrically disconnected from the other and an insulated shield extension which is electrically connected at one of its ends to one of said shielded sections; and
a second cable, disposed generally parallel to said first cable, having a first electrical conductor defining two ends, two spaced apart shielded sections, each of which is electrically disconnected from the other and one insulated shield extension which is electrically connected at one of its ends to that one of the two shielded sections on said second cable which is disposed adjacent to the other of the shielded sections on the first cable having apparatus comprising:
a. an insulated electrical housing defining a connecting cavity and a protection cavity each of which is open to the exterior of said housing;
b. insulated cover means, removably connected to said housing, for covering said connecting cavity;
c. a first electrical conductor having one end which is adapted to be electrically connected to the free end of one of said shield extensions and an opposite end disposed within said connecting cavity;
d. a second electrical connector having one end which is adapted to be electrically connected to the free end of the other shield extension and an opposite end disposed within said connecting cavity;
e. link means, carried by said cover means, for removably and electrically connecting together said opposite ends of said first and second electrical conductors;
f. plug means, carried by said housing, for plugging said protection cavity of said housing; and
g. a first electrical terminal, carried by said plug means and having one end disposed outwardly from said housing for electrically connecting said link means to the exterior of said housing when said cover means is connected to said housing, whereby oppositely disposed shielded sections of said first cable and said second cable are cross-bonded together and connected to said first electrical terminal when said cover means is connected to said housing.

6. The apparatus set forth in claim 5, wherein said link means is removably connected to said plug means.

7. The apparatus set forth in claim 5, further including sealing means, carried by one of said cover means and said housing, for pressure sealing the interior of said connecting cavity from the exterior of said housing when said cover means is connected to said housing.

8. The apparatus set forth in claim 5, wherein said plug means is removably carried by said housing and wherein said plug means includes means for sealing said protection cavity from the exterior of said housing.

9. The apparatus set forth in claim 8, wherein said housing includes:
a coupling, disposed between said protection cavity and said connecting cavity for electrically connecting said link means to said first electrical terminal when said cover means is connected to said housing and wherein said plug means includes;
protection means, adapted to be removably connected to said coupling, for electrically connecting said first electrical terminal to said coupling.

10. The apparatus set forth in claim 8, further including means, carried by said housing, for holding said plug means sealingly engaged with said protection cavity.

11. The apparatus set forth in claim 9, wherein said protection means includes a varistor which electrically connects said coupling in series with said first terminal when said plug means is plugged into said protection cavity,
whereby said cross-bonded shielded cables are protected from an over voltage condition when said first electrical terminal is electrically grounded when said protection means and said cover means are connected to said housing.

12. The apparatus set forth in claim 5, further including:
a second electrical terminal having one end disposed to the exterior of said housing; and
test cover means, adapted to fit within said connecting cavity, for connecting one of the ends of the two shielded extensions which are disposed within said connecting cavity to said second electrical terminal.

13. The apparatus set forth in claim 9, further including:
a. intermediate plugging means, adapted to removably plug said protection cavity, for electrically connecting said plug means to said coupling, said plugging means defining an internal cavity adapted to house said protection means; and b. a second terminal, carried by said plugging means, for electrically connecting said coupling to the exterior of said housing.

14. The apparatus set forth in claim 6, further including test means, removably carried by said cover means, for connecting one of the ends of the two shielded extensions which are disposed within said connecting cavity to the exterior of said housing, whereby one of said shielded extensions is electrically connected to the exterior of said housing when said link means is removed from said cover means.

15. Apparatus for cross-bonding, single-point bonding or multipoint bonding electrical power cables, comprising:

a. an insulated electrical housing, having a connecting cavity open to the exterior of said housing, adapted to receive a first electrical conductor having one end disposed to the exterior of said housing and an opposite end disposed within said connecting cavity and a second electrical conductor having one end disposed to the exterior of said housing and an opposite end disposed within connecting cavity;

b. insulated cover means, removably carried by said housing, for covering said connecting cavity;

c. linking means, removably carried by said cover means, for removably and electrically connecting together those ends of said first and second electrical conductors which are disposed within said connecting cavity; and d. connecting means, carried by said housing, for electrically connecting said linking means to the exterior of said housing, whereby said first and second electrical conductors are electrically connected together and to the exterior of said housing when said cover means is in place.

16. The apparatus set forth in claim 15, further including:

a. test cover means, adapted to be removably installed within said connecting cavity, for connecting said one end of one of said first electrical conductor and said second electrical conductor to a first terminal disposed to the exterior of said housing and for connecting said connecting means to a second terminal disposed to the exterior of said housing, whereby when said insulated cover means is removed and said test cover means is installed, said one electrical conductor and said connecting means are electrically accessible from the exterior of said housing.

* * * * *